Patented June 20, 1944

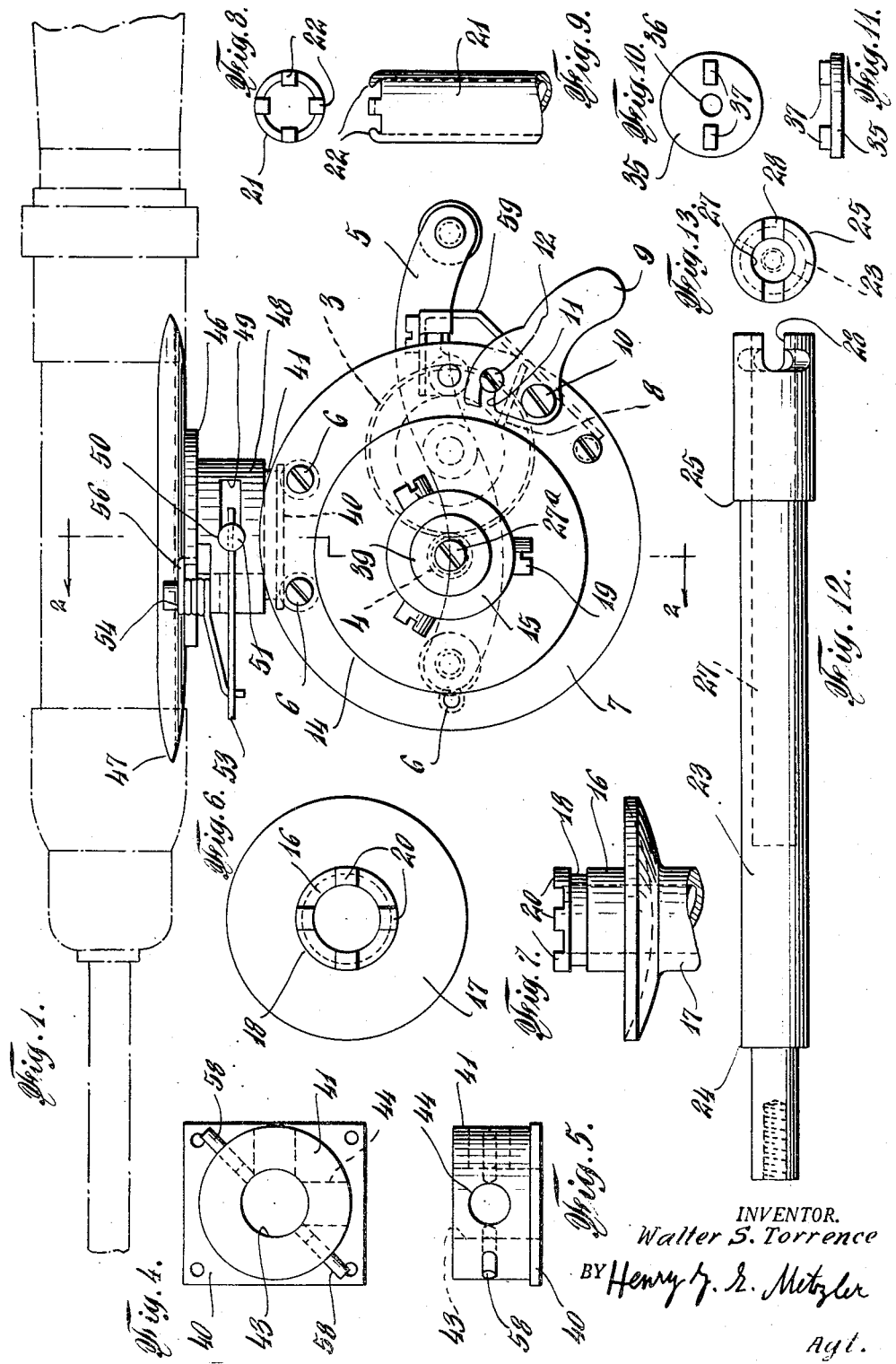

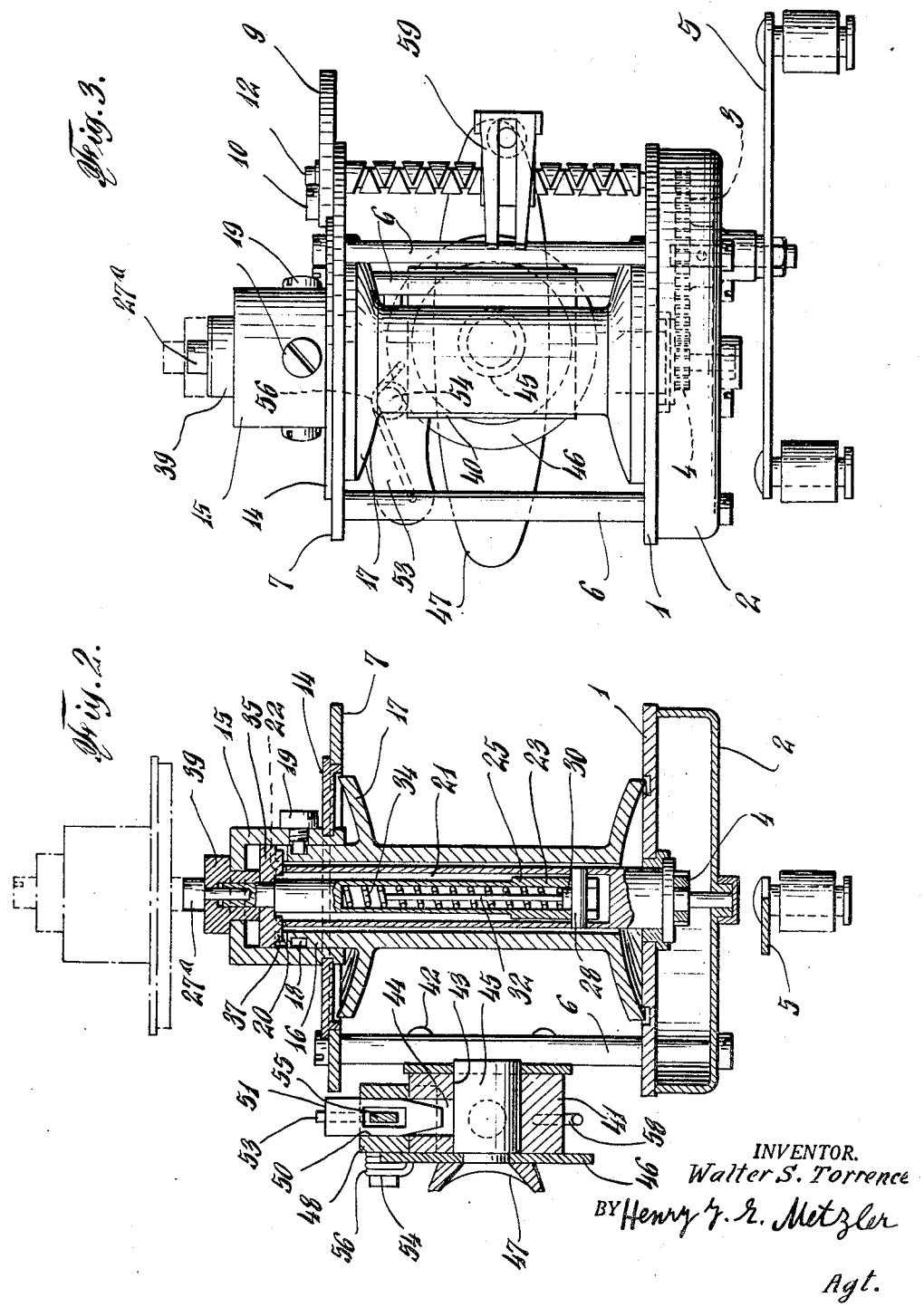

2,352,138

UNITED STATES PATENT OFFICE 2,352,138

FISHING REEL

Walter S. Torrence, New York, N. Y.

Application May 19, 1943, Serial No. 487,546

1 Claim. (Cl. 242—84.7)

My invention relates to improvements in fishing reels, and the objects of my improvement are as follows:

First, the provision of a fishing reel the spool of which can be disconnected swiftly and easily from the mechanism by which the spool is turned when the fishing line is wound upon it, so that the spool can run as a so-called "free spool";

Second, to facilitate the removal of the spool from the reel and also to facilitate its replacement to the greatest possible degree;

Third, to provide the fishing reel with an improved reel seat which insures a safe connection between the reel and the fishing rod, and which allows one to instantaneously change the position of the reel so that its axis will be either parallel or rectangular to the axis of the fishing rod.

Further objects of the instant invention reside in any novel feature of construction or novel combination of parts present in the embodiment of the invention described and shown in the accompanying drawings.

In the drawings:

Figure 1 is a side elevation of the entire device;

Fig. 2 is a sectional view on the line 2—2 of Fig. 1;

Fig. 3 is a bottom plan view of the device;

Fig. 4 is a top plan view of a retail;

Fig. 5 is a side elevation of the detail shown in Fig. 4;

Fig. 6 is a top plan view of another detail;

Fig. 7 is a side elevation of the detail shown in Fig. 6, partially broken away;

Fig. 8 is a top plan view of still another detail;

Fig. 9 is a side elevation of the detail shown in Fig. 8, partially broken away;

Fig. 10 is a face plan view of a further detail;

Fig. 11 is a side elevation of the detail shown in Fig. 10;

Fig. 12 is a side elevation of still a further detail drawn on an enlarged scale; and Fig. 13 is a bottom plan view of the detail shown in Fig. 12.

Similar numerals refer to similar parts throughout the several views.

The plate 1 to which the cap 2, covering the transmission gears 3 and 4, and the handle 5 are attached, the rods 6, and the yielding interrupted ring 7 constitute the framework of the device. The ring 7 is interrupted at 8 and is provided at one end with a lever 9, which is pivotally connected thereto at 10. A slot 11 in the lever 9 is adapted to engage the bolt 12, which is secured to the other end of the yielding ring 7, so that the ring 7 can be pressed together by the lever 9. The ring 7 encompasses a disk 14 in such a manner that the disk 14 will be firmly connected to the ring 7 if the lever 9 is in the position shown in Fig. 1; that, however, the disk 14 can be removed from the ring 7 if the lever 9 is swung around the pivot 10 so far that the slot 11 no longer engages the pin 12.

A cap 15 is secured to the disk 14 and serves as a bearing for the hub 16 of the spool 17, which is adapted to wind up the fishing line not shown. The hub 16 (Figs. 2, 6, and 7) is provided with an annular recess 18 into which engage the ends of threaded pins 19, which are radially screwed into the wall of the cap 15.

The face of the hub 16 is provided with claws 20, and through the spool 17 extends a hollow shaft or axis 21, which has inwardly inclined claws 22 (Figs. 2, 8, and 9) at one end adjacent the claws 20 of the hub 16. The hollow axis 21 can be turned by the pinion 4, which is secured to the other end of the axis 21 and which is driven by the gear wheel 3 and the handle 5, previously referred to.

A bolt 23, which is shown on an enlarged scale in Figs. 12 and 13, extends into the hollow axis 21. The bolt 23 is set off at 24 and at 25 and is provided with a bore 27. Its lower end is provided with two rectangular slots 28, which engage a pin 29 secured to the hollow axis 21 if the bolt 23 is in the position shown in Fig. 2 in full lines. A pin 32, having a head 30, is in the bore 27 and is pressed toward the pin 29 by means of a spring 34.

A coupling member, consisting of a round plate 35 (Figs. 2, 10, and 11), having an aperture 36, and of claws 37 secured to said plate 35, in the cap 15 is adapted to engage the claws 20 and 22 so that the hollow axis 21 is connected to the spool 17 if the parts are in the position shown in Fig. 2 in full lines.

The upper part of the bolt 23 extends through the plate 36; and the part 39, which extends through the cap 15, is secured to the bolt 23 by a screw 27a or in any other suitable manner.

As stated above, in the position shown in Fig. 2 in full lines, the spool 17 is connected to the axis 21 so that the spool will be turned if the handle 5 is being manipulated for the purpose of winding up a fishing line. If, however, the part 39 is turned about a quarter of a revolution relative to the hollow axis 21, the bayonet joint consisting of the pin 29 and the rectangular slots 28 will be disconnected, and the spring 34 will press the bolt 23, the plate 35, and the part 39 away from the bolt 29 so that the top of the plate 35 will rest against the inner top surface of the cap 15 and that the claws 37 will no longer engage the claws 20 and 22; thereby the spool 17 is disconnected from the axis 21 (free spool) so that the fishing line can be let out and wound off the free spool 17 without moving the axle 21 and the handle 5. If the spool 17 is disconnected from the axle 21, the part 39 is in the position shown in Fig. 3 in dash-and-dotted lines.

In order to re-connect the spool 17 to the axle 21, one presses against the part 39 with a finger, so that it will be brought back into the position shown in full lines, and turns the handle 5 until the rectangular slots 28 engage the pin 29.

In order to take the spool 17 partially out of the reel, one moves the handle 9 so that the slot 11 disengages the bolt 12, whereupon the pressure of the spring 34 will move the disk 14, the bolt 23, the cap 15, etc. into a position which is indicated in dash-and-dotted lines in Fig. 2. The fishing line (not shown) can then be led through the interruption 8 of the ring 7 and can be wound off the spool 17 in an axial direction. Joint 28, 29 must be disconnected before the disk 14 and bolt 23 may be moved into the position shown in dash-and-dotted lines in Fig. 2.

I prefer to connect my improved fishing reel to the fishing rod, which is partially indicated in Fig. 1 in dash-and-dotted lines, by means of an improved reel seat, which is constructed in the following manner:

A plate 40 carrying a ring 41 is secured to two rods 6 by means of rivets 42 or in any other suitable manner. The ring 41, which is shown in detail in Figs. 4 and 5, has a cylindrical central aperture 43 and has radial apertures 44, (preferably two apertures 44 which are arranged at right angles to each other) in the wall of the ring 41. A bolt 45, which fits tightly into the aperture 43, is connected to a disk 46 and to a shell 47, which is adapted to be connected to a fishing rod in a well known manner. The bolt 45 can be secured to the parts 46 and 47 in any suitable manner, preferably by riveting the bolt 45 and the parts 46 and 47 together as in the instance shown. A block 48, having a slot 49 and an aperture 50, is secured to the plate 46; and a pin 51 extends through the aperture 50 and is shiftable therein and adapted to engage the radial apertures 44 in the ring 41. A lever 53 is pivotally connected to the plate 46 at 54 and engages the bolt 51 by extending through a slot 55, which is in the bolt 51. A spring 56, acting upon the lever 53, presses the bolt 51 towards the ring 41 and into one of the apertures 44 whenever the bolt 51 is adjacent one of the apertures 44. Pins 58 secured to the ring 41 are adapted to limit the angular movement of the block 48 and of the parts 47, 46, etc. relative to the ring 41.

My improved fishing reel is also provided with a level winding arm 59, which, however, is no part of my present invention.

The reel is mounted so that it can be turned parallel with the rod, as previously referred to, because when the spool is released and comes part way out of the reel frame, the fishing line can be cast off the spool without the spool revolving. Thus the fishing line comes off over the end of the spool, which prevents getting a back lash in the fishing line, as the spool does not revolve when casting out the line. After the line is cast out, one pushes the spool back into the frame and turns the reel back crosswise to the rod; then the spool can be rotated for winding in the line by turning the handle 5 of the reel.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

What I claim as my invention and desire to secure by Letters Patent in the United States is:

In a fishing reel, in combination, a spool provided with a hub at one side which has claws at its face and an annular recess at its outer side, a hollow axle carrying said spool and having inwardly inclined claws at one end adjacent the claws of said spool, a bolt extending into said hollow axle and being connected to it by a bayonet joint, resilient means for moving said bolt axially within said hollow shaft, a frame carrying said hollow axle and having at one side an interrupted yielding ring which holds a disk, a cap secured to said disk covering the hub of said spool and engaging said angular recess, a clutch member within said cap adapted to engage the claws of said hub and of said axle, means for limiting the axial movement of said bolt which extends through said clutch member and through said cap, a reel seat adapted to connect said frame to a fishing rod, and means for facilitating the turning of said frame on said reel seat and for retaining it in a desired position, all substantially as described.

WALTER S. TORRENCE.